(12) United States Patent
Nguyen et al.

(10) Patent No.: US 9,094,302 B2
(45) Date of Patent: Jul. 28, 2015

(54) SYSTEM AND METHOD TO DISCOVER VIRTUAL MACHINE INSTANTIATIONS AND CONFIGURE NETWORK SERVICE LEVEL AGREEMENTS

(75) Inventors: Cuong T. Nguyen, Austin, TX (US); Rabah S. Hamdi, Spring, TX (US)

(73) Assignee: Dell Products, LP, Round Rock, TX (US)

( * ) Notice: Subject to any disclaimer, the term of this patent is extended or adjusted under 35 U.S.C. 154(b) by 72 days.

(21) Appl. No.: 13/447,763

(22) Filed: Apr. 16, 2012

(65) Prior Publication Data
US 2013/0275568 A1 Oct. 17, 2013

(51) Int. Cl.
*G06F 15/173* (2006.01)
*H04L 12/24* (2006.01)

(52) U.S. Cl.
CPC ........ *H04L 41/0806* (2013.01); *H04L 41/5025* (2013.01)

(58) Field of Classification Search
CPC ........................ H04L 43/0811; H04L 12/4633
USPC ........... 370/216; 709/221, 223, 230, 232, 236
See application file for complete search history.

(56) References Cited

U.S. PATENT DOCUMENTS

| | | | |
|---|---|---|---|
| 2009/0219831 A1* | 9/2009 | Shaker et al. ................. | 370/254 |
| 2009/0225661 A1* | 9/2009 | Salam et al. .................. | 370/242 |
| 2010/0188983 A1* | 7/2010 | Washam et al. ............... | 370/245 |
| 2010/0238791 A1* | 9/2010 | Duncan et al. ................ | 370/216 |
| 2010/0238808 A1* | 9/2010 | Salam et al. ............... | 370/241.1 |
| 2011/0022698 A1* | 1/2011 | Salam et al. .................. | 709/224 |
| 2011/0051597 A1* | 3/2011 | Cohen et al. .................. | 370/221 |
| 2011/0161526 A1* | 6/2011 | Ravindran et al. ............ | 709/250 |
| 2011/0249567 A1* | 10/2011 | Kini et al. ................. | 370/241.1 |
| 2011/0321065 A1* | 12/2011 | Gopalakrishnan et al. ... | 719/328 |
| 2012/0014263 A1 | 1/2012 | Unger et al. | |
| 2012/0140639 A1* | 6/2012 | Kao et al. .................... | 370/241.1 |
| 2012/0233611 A1* | 9/2012 | Voccio ............................ | 718/1 |
| 2013/0055249 A1* | 2/2013 | Vaghani et al. .................. | 718/1 |
| 2013/0114394 A1* | 5/2013 | Hu et al. ....................... | 370/216 |
| 2013/0229924 A1* | 9/2013 | Salam et al. .................. | 370/244 |

OTHER PUBLICATIONS

Title: Integration of Service-Level Monitoring with Fault Management for End-to-End Multi-Provider Author:Pal Varga; Date: Jun. 2007 Publisher: IEEE Transaction on Network and Service Management Voulme: vol. 4, No. 1; Pertinent Pages: p. 31 Connectivity Fault Management and Service Level Monitoring.*
Connectivity Fault Management, IEEE 802.1 Tutorial, Portland, Jul. 12, 2004 http://www.ieee802.org/802_tutorials/04-Jul./nfinn-cfm-tutorial-1.pdf.

* cited by examiner

*Primary Examiner* — Brian J Gillis
*Assistant Examiner* — Steve Lin
(74) *Attorney, Agent, or Firm* — Larson Newman, LLP

(57) ABSTRACT

A method includes establishing a connectivity fault management (CFM) management domain that includes a host processing system and a network element, determining that a media access control (MAC) address of the host processing system is associated with a network service level agreement (SLA), issuing a CFM frame to the management domain, receiving the CFM frame, and configuring the network element according to the network SLA.

20 Claims, 7 Drawing Sheets

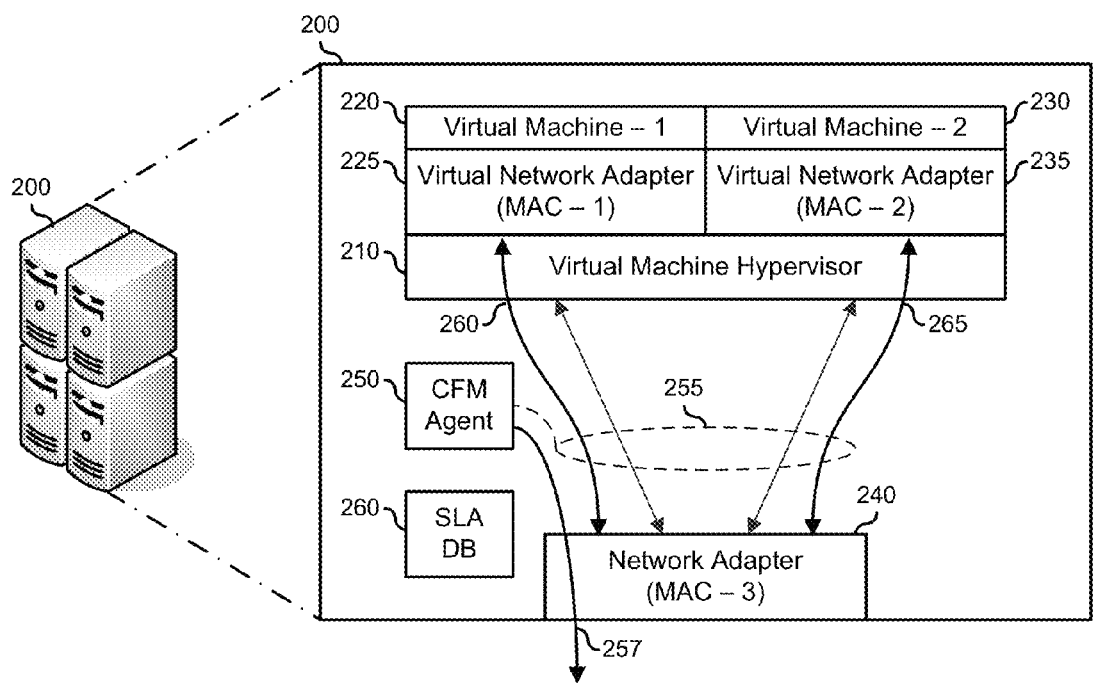
FIG. 2
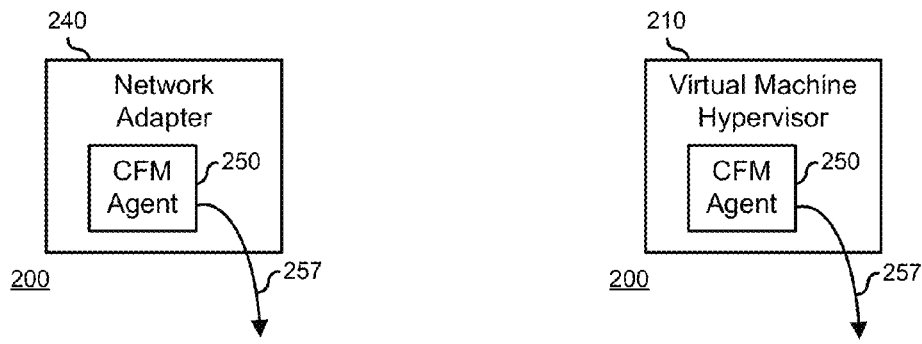
FIG. 3
FIG. 4

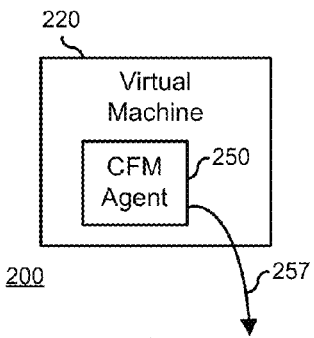
FIG. 5
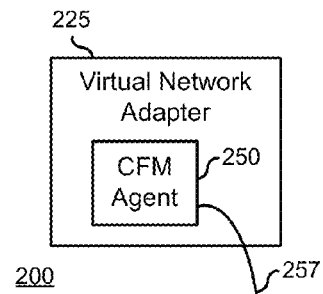
FIG. 6
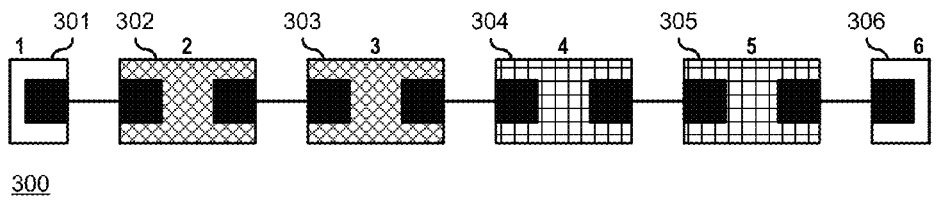
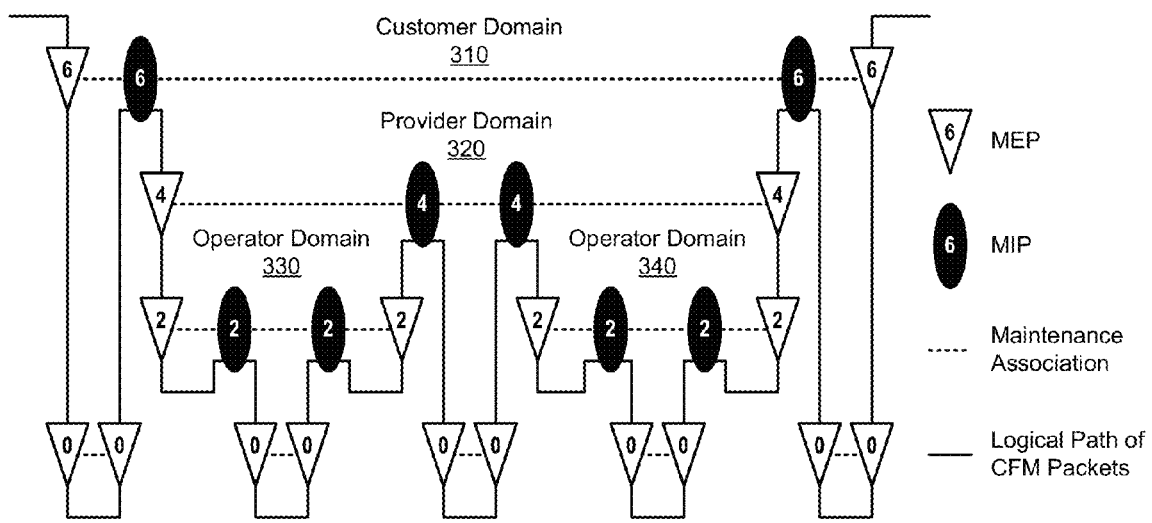
FIG. 7

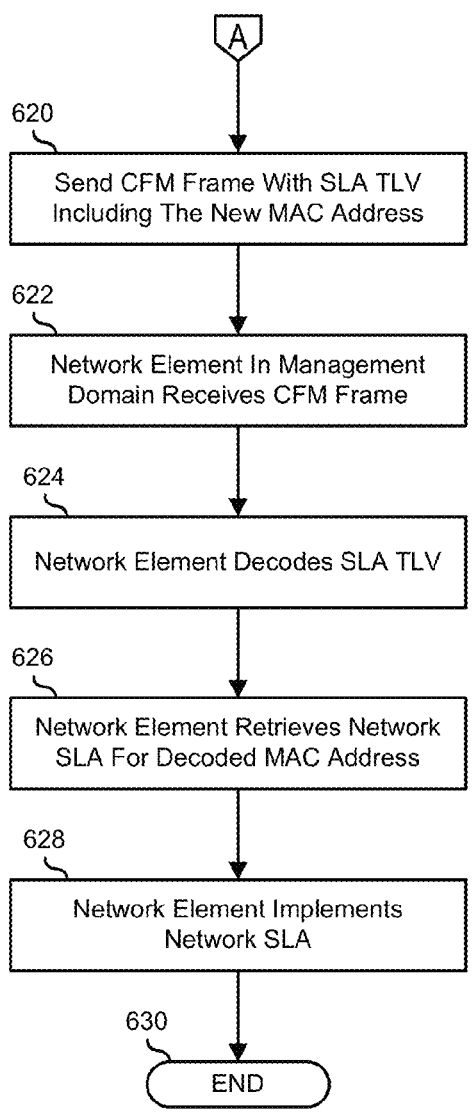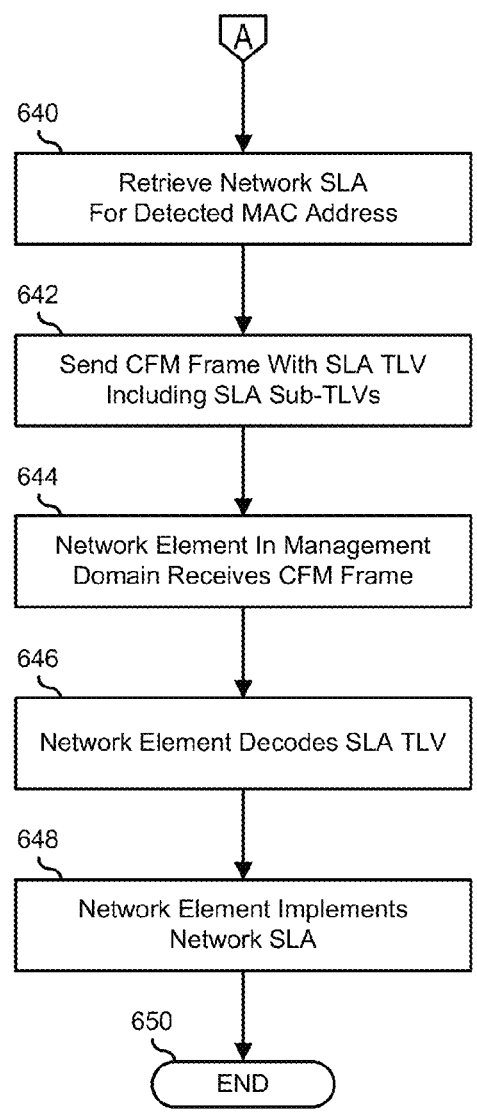
*FIG. 11*  *FIG. 12*

SYSTEM AND METHOD TO DISCOVER VIRTUAL MACHINE INSTANTIATIONS AND CONFIGURE NETWORK SERVICE LEVEL AGREEMENTS

FIELD OF THE DISCLOSURE

This disclosure relates generally to information handling systems, and relates more particularly to configuring network switching.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which:

FIG. 2 is a block diagram of a host processing system of the virtualized environment of FIG. 1;

FIGS. 3-6 are block diagrams of different embodiments of the host processing system of FIG. 2;

FIG. 7 is a block diagram of a connectivity fault management (CFM) network including management domains according to an embodiment of the present disclosure;

FIGS. 10-12 are flow diagrams of a method of configuring a switching network with network service level agreements according to an embodiment of the present disclosure.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
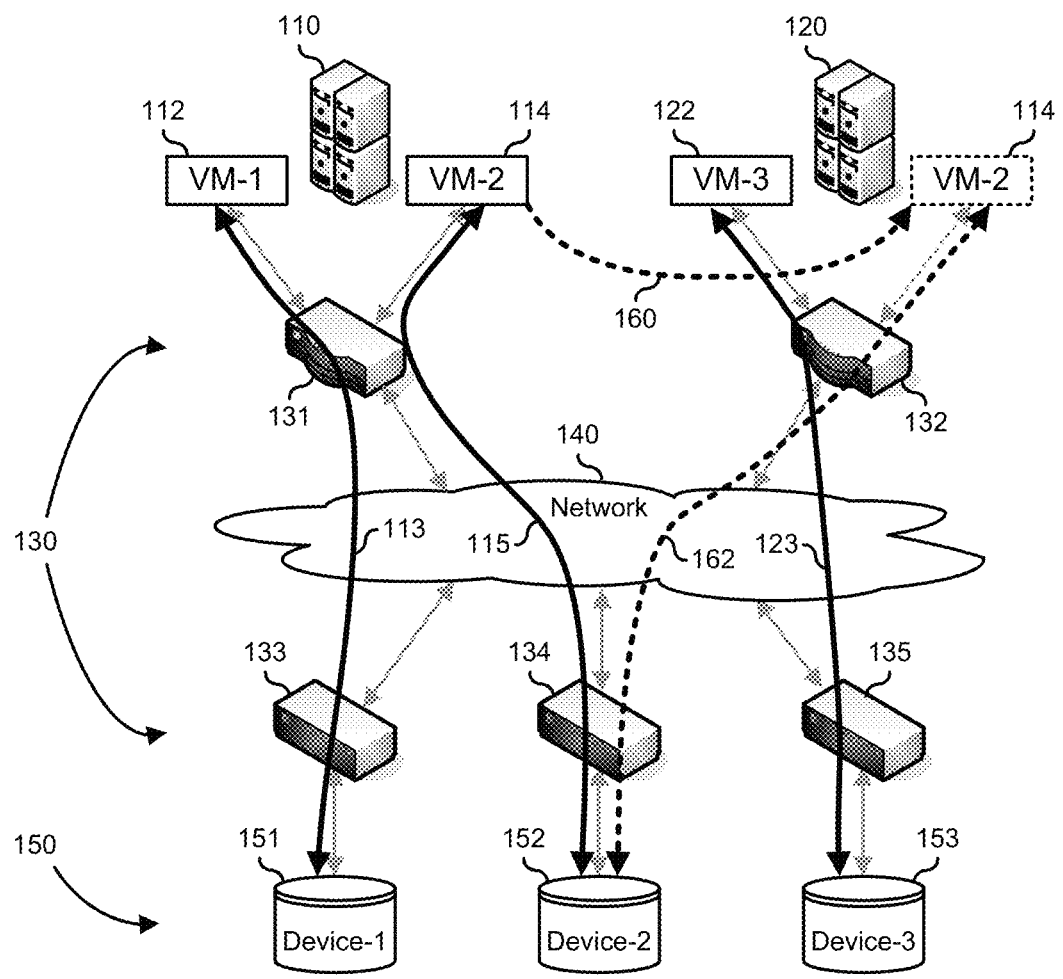
FIG. 1 is a block diagram of a virtualized network environment according to an embodiment of the present disclosure.

FIG. 1 illustrates a virtualized network environment 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, virtualized network environment 100 includes a host processing system 110, one or more additional host processing systems 120, a managed switching network 130, a core switching network 140, and a storage tier 150. Managed switching network 130 includes routers 131-135. Storage tier 150 includes storage devices 151-153. The processing resources of host processing systems 110 and 120 are allocated to one or more virtual machines operating on their respective host processing system to perform associated workloads. As such, host processing system 110 includes a virtual machine 112 associated with a first workload and one or more additional virtual machines 114 associated with one or more additional workloads. Similarly, host processing system 120 includes a virtual machine 122 associated with a third workload. Virtual machines 112, 114, and 122 share the resources of network adapters within their respective host processing systems 110 and 120 to gain access to the network switching functionality of managed switching network 130 and of core switching network 140, and to the data storage functionality of storage tier 150.

The network adapters transfer data between their respective host processing systems 110 and 120 and storage tier 150 via switching networks 130 and 140 according to one or more protocols associated with the switching networks. A non-limiting example of a fabric 130 includes a Small Computer System Interface (SCSI) fabric, a Fibre Channel (FC) fabric, an Internet SCSI (iSCSI) fabric, another data fabric or any combination thereof. Routers 131 and 132 connect respective host processing systems 110 and 120 to core switching network 140. In a particular embodiment, host processing systems 110 and 120 each include a virtual machine hypervisor that manages respective virtual machines 112, 114, and 122 and provisions each virtual machine with one or more virtual network adapters. As such, routers 131 and 132 operate to provide connectivity and routing between virtual machines 112, 114, and 122 and core switching network 140. Routers 133-135 connect respective storage devices 151-153 to core switching network 140.

Storage tier 150 includes storage devices 151-153. Each storage device 151-153 operates to store and retrieve data for virtual machines 112, 114, and 122. In a particular embodiment, storage devices 151-153 represent physical storage devices such as disk storage arrays, tape backup storage devices, solid state storage devices, other physical storage devices, or a combination thereof. In another embodiment, storage devices 151-153 represent virtual storage devices such as virtual partitions on one or more physical storage device. Moreover, storage devices 151-153 can represent a combination of physical and virtual storage devices.

When the virtual machine hypervisor instantiates virtual machine 112 on host processing system 110, the virtual machine is provided with access to storage resources located on storage device 151, and a communication path 113 is established from the virtual machine, through router 131, core switching network 140, and router 133 to the storage device. To facilitate communication between virtual machine 112 and storage device 151, routers 131 and 133 are provided with information related to the communication parameters that are enabled to satisfy the needs of communication path 113. As such, a service level agreement (SLA) that includes the communication parameters for communication path 113 is implemented by routers 131 and 132. For example, an SLA can define maximum and minimum ingress and egress bandwidths, a maximum burst rate, a priority level for the traffic, one or more virtual local area networks (VLANs) associated with communication path 113, access control and rate shaping parameters, maximum transfer unit (MTU) size, other communication parameters, or a combination thereof. Similarly, communication path 115 is established from virtual machine 114, through router 131, core switching network 140, and router 134 to storage device 152 when the virtual machine is instantiated on host processing system 110, and the routers are provided with an SLA associated with the communication path. Moreover, communication path 123 is established from virtual machine 122, through router 132, core switching network 140, and router 135 to storage device 153 when the virtual machine is instantiated on host processing system 120, and the routers are provided with an SLA associated with the communication path.

In a particular embodiment, virtual machine 114 is migrated 160 to host processing system 120, and a communication path 162 is established from the migrated virtual machine through router 132, core switching network 140, and router 134 to storage device 152 when the virtual machine is migrated, and the routers are provided with an SLA associated with the communication path. Note that the SLA associated with communication path 162 will be substantially similar to the SLA associated with communication path 115. In a particular embodiment, SLAs associated with communication paths 113, 115, 123, and 162 are automatically programmed into respective routers 131-135, as described below.

In a particular embodiment, host processing systems 110 and 120, managed switching network 130, and storage tier 150 are processing elements that are associated together to provide a seamless processing solution. For example, host processing systems 110 and 120, managed switching network 130, and storage tier 150 can be geographically separated processing elements of a commonly operated data processing solution, such as a wide-area network (WAN), an Internet service provider (ISP) or web host, a content delivery network, a cable or Internet protocol television (IPTV) provider, another geographically diverse network, or a combination thereof. In another example, host processing systems 110 and 120, managed switching network 130, and storage tier 150 can be modular processing elements of a localized datacenter. Here, host processing systems 110 and 120 can represent modular processing units such as blade servers, rack servers, or the like that reside in a common chassis, and routers 131 and 132 can represent top-of-rack (TOR) switches that connect the various processing units represented by host processing systems 110 and 120. Further, routers 133-135 and storage tier 150 can represent one or more storage area networks (SANs). In particular, host processing systems 110 and 120, managed switching network 130, and storage tier 150 can represent processing units that share a common manufacturer or that include a common set of supported features such that the host processing systems, the managed switching network, and the storage tier are interoperable in teens of their supported features. For example, host processing systems 110 and 120, managed switching network 130, and storage tier 150 can operate according to the IEEE 802.1ag Standard for Local and Metropolitan Area Networks Virtual Bridged Local Area Networks, Amendment 5 to provide connectivity fault management (CFM) protocol interoperability between the host processing systems, the managed switching network, and the storage tier.

In a particular embodiment, the CFM protocol is utilized in virtualized network environment 100 to communicate SLAs for virtual machines 112, 114, and 122 to the elements of managed switching network 130. In particular, when the virtual machine hypervisor on host processing system 110 or 120 instantiates virtual machine 112, 114, or 122, and provisions the virtual machine with a virtual network adapter, then network traffic associated with the virtual network adapter is used to provide an indication of the presence of a new network connection, and of the need to establish a new network SLA for the virtual machine. For example, transactions originating from migrated virtual machine 114 on host processing system 120 can have a previously unrecognized media access control (MAC) address or Internet protocol (IP) address associated with the migration 162 of the virtual machine to the host processing system. In a particular embodiment, when a new virtual machine is detected, a CFM agent initiates one or more CFM transactions that include network SLA type-length-value fields (TLVs) that represent the communication parameters and that are be used by elements of managed switching network 130 to configure themselves in accordance with the communication parameters. In another embodiment, when a new virtual machine is detected, a CFM agent initiates one or more CFM transactions that include TLVs that represent the address of the virtual machine. Here, the address is used by elements of managed switching network 130 to query an SLA database that provides the elements with the communication parameters with which the elements configure themselves.

FIG. 2 illustrates an embodiment of a host processing system 200 similar to host processing system 110, including a virtual machine hypervisor 210, a network adapter 240, a CFM agent 250, and an SLA database 260. Virtual machine hypervisor 210 instantiates a virtual machine 220 on host processing system 200, and provisions the virtual machine with a virtual network adapter 225. Virtual machine hypervisor 210 also instantiates a virtual machine 230 on host processing system 200, and provisions the virtual machine with a virtual network adapter 235. When virtual machine 220 or 230 makes a network access, CFM agent 250 detects 255 the source address of the network access and determines if the address is a new address associated with host processing system 200. For example, virtual machine 220 can access resources of a network connected to network adapter 240 via virtual network adapter 225, and transactions initiated by the virtual machine will be sent by the virtual network adapter, and will include a MAC address or an IP address for the virtual network adapter. CFM agent 250 can detect these transactions and determine that virtual machine 220 is newly instantiated on host processing system 200. When the address is new, CFM agent 250 retrieves a network SLA for the address from SLA database 260, and initiates CFM transactions 257 that include network SLA TLVs that represent the fact that virtual machine 220 or 230 is newly instantiated on host processing system 200. In a particular embodiment, SLA database 260 can be separate from host processing system 200, such as by residing in a common SLA database for managed switching network 130 that is accessible to the network elements of the managed switching network.

FIG. 3 illustrates an embodiment of host processing system 200 where network adapter 240 includes the functionality of CFM agent 250. Here, when virtual machine 220 or 230 makes a network access, CFM agent 250 detects the source address of the network access and determines if the address is a new address associated with host processing system 200. When the address is new, CFM agent 250 retrieves the network SLA from SLA database 260, and initiates CFM transactions 257 that include the network SLA TLVs.

In FIG. 4, virtual machine hypervisor 210 includes the functionality of CFM agent 250. Here, when virtual machine hypervisor 210 instantiates a new virtual machine, CFM agent 250 initiates CFM transactions 257 that include the network SLA TLVs. However, in this embodiment, because virtual machine hypervisor 210 is aware of the creation of new virtual machines, CFM transactions 257 can be initiated in advance of a first network transaction provided by the virtual machine. In another embodiment, virtual machine hypervisor 210 includes SLA database 260, and a network SLA is established by the virtual machine hypervisor when a new virtual machine is instantiated.

FIG. 5 illustrates an embodiment of host processing system 200 where virtual machine 220 includes the functionality of CFM agent 250. Here, when virtual machine 220 is instantiated, CFM agent 250 initiates CFM transactions 257 that include the network SLA TLVs. In this embodiment, virtual machine 220 is aware of its creation, and so CFM transactions 257 are initiated in advance of a first network transaction provided by the virtual machine. In another embodiment, virtual machine 220 includes SLA database 260, and a network SLA is provided to the virtual machine when the virtual machine is instantiated.

FIG. 6 illustrates an embodiment of host processing system 200 where virtual network adapter 225 includes the functionality of CFM agent 250. Here, when virtual machine hypervisor 210 provisions virtual machine 220 with virtual network adapter 225, CFM agent 250 initiates CFM transactions 257 that include the network SLA TLVs. In this embodiment, virtual network adapter 225 is aware of its creation, and CFM transactions 257 are initiated in advance of a first network transaction provided by the virtual machine. In another embodiment, virtual network adapter 225 includes SLA database 260, and a network SLA is provided to the virtual network adapter when the virtual machine is instantiated.

FIG. 7 illustrates an embodiment of a CFM network 300 similar to managed switching network 130, and including bridges 301-306. Bridges 301-306 operate according to the CFM protocol. CFM network 300 is associated with a maintenance association identifier (MAID), such that each of bridges 301-306 is associated with MAID of CFM network 300. CFM network 300 includes a set of management domains, including a customer domain 310 having a management domain level of "6," a provider domain 320 having a management domain level of "4," and operator domains 330 and 340, each having a management domain level of "2." Each link between bridges 301-306 are represented as having a management domain level of "0." Each management domain includes management domain end-points (MEPs) which define the outer boundary of the associated management domain. MEPs operate to send and receive CFM frames through a relay function, and to drop all CFM frames that are received from inside the associated management domain when the CFM frames are of the same, or a lower management domain level as the particular MEP. Each management domain can also include one or more management domain intermediate-points (MIPs) which are in the interior of the associated management domain. MIPs operate to receive, catalog, and forward CFM frames that are received from other MEPs and MIPs, and to drop all CFM frames that are received from other MEPs and MIPs when the CFM frames are of the same, or a lower management domain level as the particular MIP.

Note that a particular bridge 301-306 can be an MEP for a first management domain, and can also be an MIP for a second management domain. Note further that a particular bridge 301-306 can also be an MEP for more than one management domain. Thus customer domain 310 includes two MEPs, bridges 301 and 306, and two MIPs, bridges 302 and 305. Further, bridge 302 is an MEP for provider domain 320 and for operator domain 330, and is also an MIP for customer domain 310 and for operator domain 330. Similarly, bridges 303-306 can operate as MEPs at one domain level, while simultaneously operating as MIP at the same or lower domain levels. While routers 301-306 are illustrated as being connected directly to each other, it will be understood by the skilled artisan that this is not necessarily so, and that other network devices, such as bridges, routers, hubs, switches, other network devices, or a combination thereof, can be connected between any given pair of routers 301-306.

Figure 8:
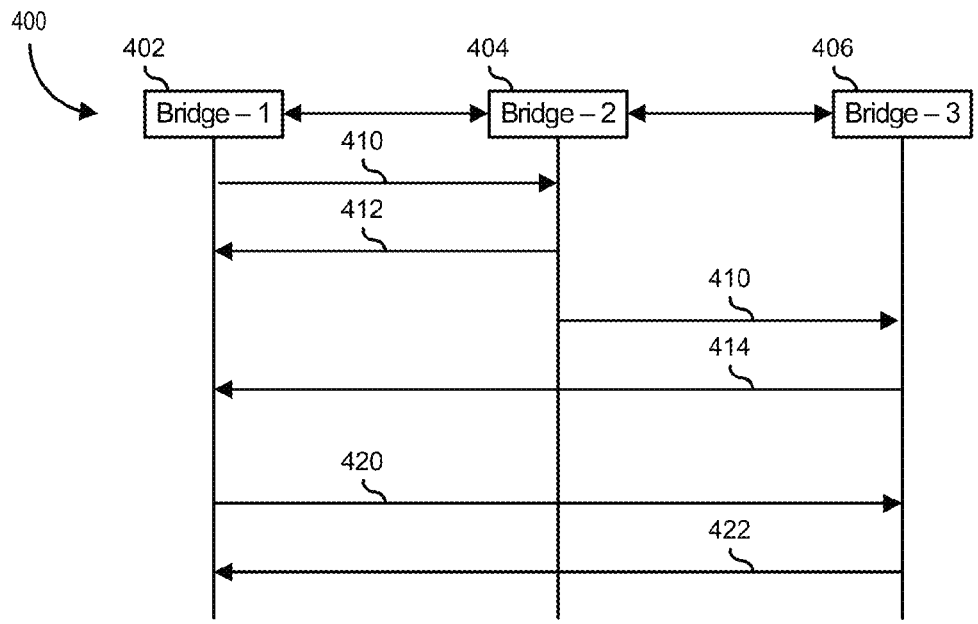
FIG. 8 is a block diagram of a CFM network according to another embodiment of the present disclosure.

FIG. 8 illustrates an embodiment of a CFM network 400 similar to CFM network 300, including bridges 402, 404, and 406. Bridges 402, 404, and 406 operate according to the CFM protocol, and can represent MEPs and MIPs for multiple management domains. However, for the purposes of illustration, bridges 402, 404, and 406 are considered to be in a common management domain. In a particular embodiment, CFM network 400 utilizes the CFM protocol to communicate network SLAs to the elements of CFM network 400. In particular, network SLAs are communicated as network SLA TLVs included in CFM frames. For example, a network SLA TLV can be included in a CFM link trace message (LTM) 410, or in a CFM Loopback Message (LBM) 420. LTM 410 is issued by bridge 402 as a multicast message with a particular multicast MAC address as the destination, and a MAC address associated with the bridge as the source. In response to receiving LTM 410, bridge 404 issues a link trace reply (LTR) 412 back to the source MAC address, and forwards LTM 410 to bridge 406. In response to receiving LTM 410, bridge 406 issues LTR 414 back to the source MAC address, and if bridge 406 is an MIP in the common management domain, forwards LTM 410 to a subsequent bridge in the common management domain. If bridge 406 is an MEP in the common management domain, then LTM 410 is dropped, and only issues LTR 414. In response to receiving LTRs 412 and 414, bridge 402 receives information regarding the bridges 404 and 406 that are in the path between bridge 402 and the device associated with the destination MAC address. In addition to providing LTRs 412 and 414 in response to LTM 410, respective bridges 404 and 406 decode the included network SLA TLV, and use the included communication parameters to configure themselves as needed or desired.

LBM 420 is issued by bridge 402 as a multicast message with a particular multicast MAC address as the destination, and a MAC address associated with the bridge as the source. In response to receiving LTM 410, bridge 404 issues an LTR 412 back to the source MAC address, and forwards LBM 420 to bridge 406. In response to receiving LBM 420, bridge 406 issues LTR 414 back to the source MAC address, and if bridge 406 is an MIP in the common management domain, forwards an LTM to a subsequent bridge in the common management domain. If bridge 406 is an MEP in the common management domain, then no LTM is forwarded, but only issues LTR 414. Here, even though bridge 404 only forwards LBM 420 to bridge 406, bridge 404 decodes the included network SLA TLV, and uses the included communication parameters to configure itself as needed or desired, as does bridge 406.

In another embodiment, bridge 402 issues CFM frames with a network SLA TLV that represents an address of a resource that has an associated SLA. Here, when bridges 404 and 406 receive a CFM frame with a network SLA TLV that represents the address of the resource, the bridges query an SLA database that provides the bridges with the communication parameters associated with the SLA. In another embodiment, bridges 402, 404, and 406 can establish secure links with the SLA database, so that the communication parameters can be securely communicated between the SLA database and the bridges. In another embodiment, a CFM frame that represents a CFM continuity check message can include a network SLA TLV.

Figure 9:
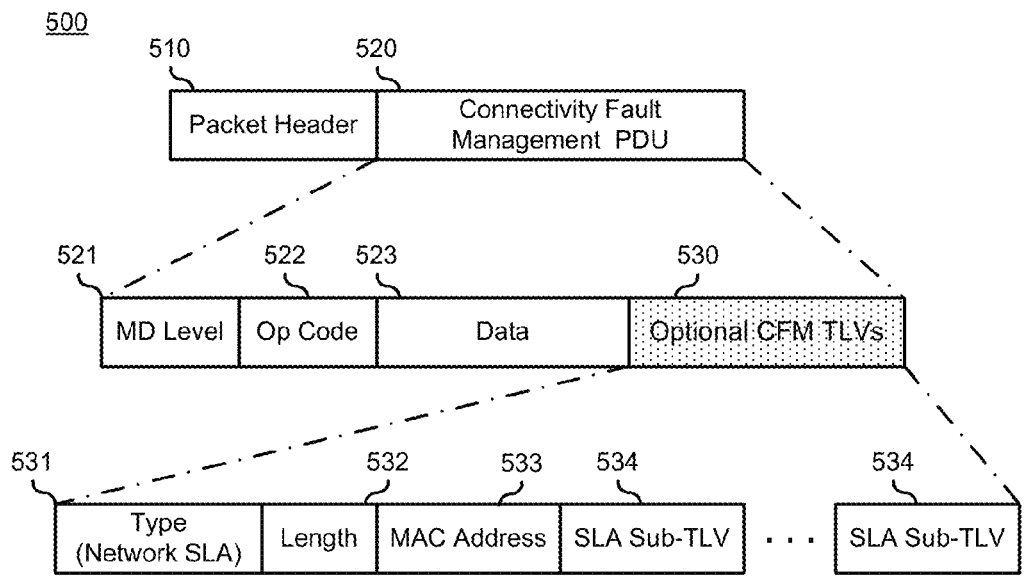
FIG. 9 is a diagram of a CFM frame according to an embodiment of the present disclosure.

FIG. 9 illustrates an embodiment of a CFM frame 500 including a packet header 510 and a CFM protocol data unit (PDU) 520. CFM PDU 520 includes a management domain level field 521, a CFM op code field 522, a CFM data field 523, and one or more optional CFM TLVs 530. Management domain level field 521 stores a value that identifies the management domain level to which CFM frame 500 is targeted. CFM op code field 522 encodes the message type for CFM frame 500. For example, an op code of 0x02 can encode a loopback reply, an op code of 0x03 can encode a loopback message, and op code 0x04 can encode a link trace message/reply. CFM data field 523 includes information that is used in implementing the operation of the CFM frame type specified by CFM op code field 522.

CFM TLV 530 includes a type field 531, a length field 532, a MAC address field 533, and one or more SLA sub-TLVs 534. Type field 531 encodes the TLV as a network SLA TLV. Length field 532 provides the length of CFM TLV 530. MAC address field 533 provides a MAC address that is associated with the network SLA TLV. For example, MAC address field 533 can include a MAC address associated with a newly instantiated virtual machine on a host processing system, and that identifies the MAC address to which to apply the communication parameters of the SLA. SLA sub-TLV 534 includes the communication parameters associated with the SLA. For example, 0x01 can encode a VLAN type SLA sub-TLV, 0x02 can encode a quality-of-service (QoS) type SLA sub-TLV, 0x03 can encode a maximum bandwidth type SLA sub-TLV, 0x04 can encode a minimum bandwidth type SLA sub-TLV, another value can encode another type of SLA sub-TLV, or a combination thereof. As such, a VLAN type SLA sub-TLV can include one or more associated VLAN names, associated maximum transmission unit (MTU) size, associated operating state, and any other information associated with the one or more VLAN names, as needed or desired. Also, a QoS type SLA sub-TLV can include a bit field that where each bit is associated with a particular QoS level, such that a set bit indicates that the associated QoS level is supported in the SLA. Further, maximum and minimum type SLA sub-TLVs can include information relating the maximum and minimum bandwidth that is supported in the SLA. Other communication parameters related to the establishment and maintenance of network SLAs can be represented by additional SLA sub-TLVs, as needed or desired.

In another embodiment, where a storage device, such as storage devices 151-153 represent devices that support the CFM protocol, additional SLA sub-TLVs are provided that support provisioning of storage resources for newly instantiated virtual machines. For example, if one or more of storage devices 151-153 represent an Internet-Small Computer System Interface (I-SCSI) device, or a Fibre-Channel-over-Ethernet (FCoE) device, then CFM frames can be received by the one or more storage devices, and a network SLA TLV can also include SLA sub-TLVs that specify a storage capacity, a storage bandwidth, or other storage parameters that are associated with a newly instantiated virtual machine.

Figure 10:
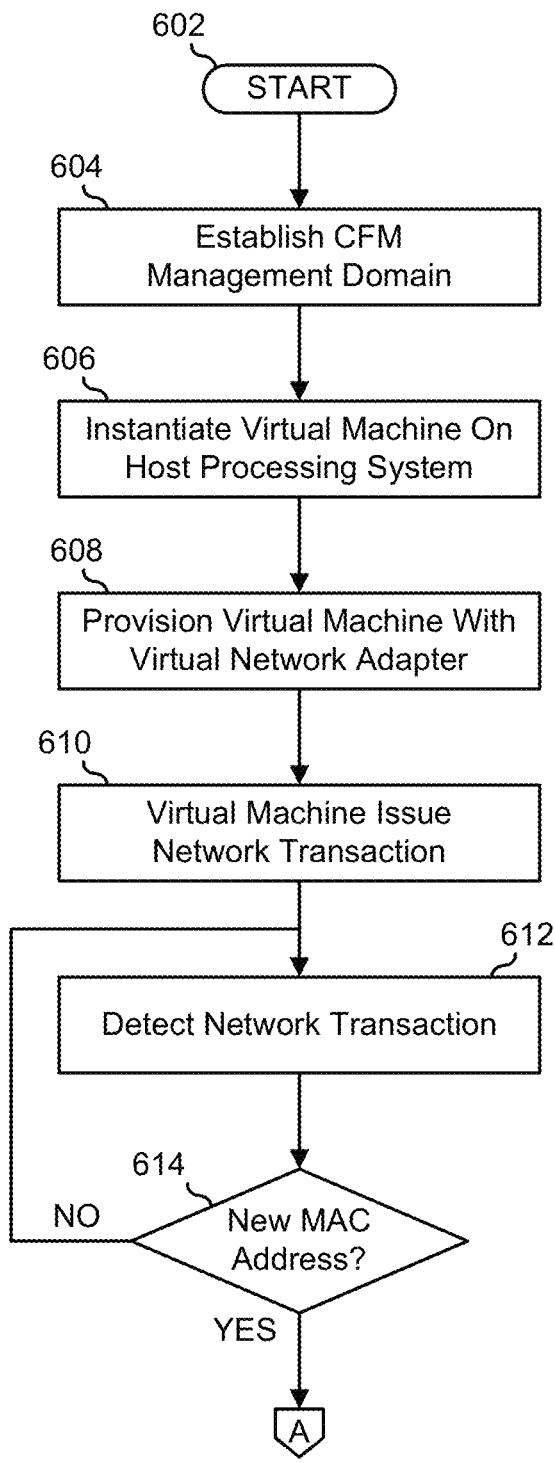

FIGS. 10-12 illustrate methods of configuring a switching network with network SLAs. The method starts at block 602. A CFM management domain is established in block 604. For example, host processing systems 110 and 120, routers 131-135, and storage devices 151-153 can be associated together as a management domain. A virtual machine is instantiated on a host processing system in block 606. Here, virtual machine 220 can be instantiated on host processing system 200 by virtual machine hypervisor 210. The virtual machine is provisioned with a virtual network adapter in block 608. Thus virtual machine hypervisor 210 can provision virtual machine 220 with virtual network adapter 225. The virtual machine issues a network transaction in block 610, and the network transaction is detected in block 612. For example, virtual machine 220 can issue a network transaction via virtual adapter 225, and CFM agent 250 can detect 255 the transaction. A decision is made as to whether or not the transaction includes a new MAC address as the source of the transaction in decision block 614. For example, CFM agent 250 can determine if the transaction has a new MAC address as the source of the transaction. If the transaction does not include a new MAC address as the source, the "NO" branch of decision block 614 is taken, and the method returns to block 612 where another network transaction is detected.

FIG. 11 illustrates one embodiment of the continuation of the method of FIG. 10. Here, if the transaction detected in block 612 includes a new MAC address as the source, as determined by decision block 614, the "YES" branch of the decision block is taken, and a CFM frame is issued to the management domain in block 620. The CFM frame includes an SLA TLV that includes the newly instantiated MAC address. For example, CFM agent 250 can issue an LTM or an LBM that includes the MAC address of virtual network adapter 255 to the management domain. A network element in the management domain receives the CFM frame in block 622. Here, bridge 404 can receive an LTM or an LBM that includes an SLA TLV. The network element decodes the SLA TLV in block 624. For example, bridge 404 can decode the SLA TLV to determine that the SLA TLV includes a MAC address, but does not include an SLA sub-TLV. The network element retrieves communication parameters for the network SLA associated with the MAC address in block 626. For example, bridge 404 can establish a link with an SLA database to retrieve the communication parameters for the network SLA that is associated with the MAC address included in the SLA TLV. The network element implements the network SLA in block 628, and the method ends in block 630.

FIG. 12 illustrates another embodiment of the continuation of the method of FIG. 10. Here, if the transaction detected in block 612 includes a new MAC address as the source, as determined by decision block 614, the "YES" branch of the decision block is taken, and the communication parameters for the network SLA associated with the MAC address is retrieved in block 640. For example, CFM agent 250 can retrieve the communication parameters for the network SLA associated with the new MAC address from SLA database 260. A CFM frame that includes SLA sub-TLVs that include the communication parameters is issued to the management domain in block 642. For example, CFM agent 250 can issue an LTM or an LBM that includes the MAC address of virtual network adapter 255, and SLA sub-TLVs that include the communication parameters for the network SLA to the management domain. A network element in the management domain receives the CFM frame in block 644. Here, bridge 404 can receive an LTM or an LBM that includes an SLA TLV and included SLA sub-TLVs. The network element decodes the SLA TLV in block 646. For example, bridge 404 can decode the SLA TLV to determine that the SLA TLV includes a MAC address, and one or more SLA sub-TLVs. The network element implements the network SLA in block 648, and the method ends in block 650.

In a particular embodiment, a network element can be configured to employ both the method as described in FIG. 11, and the method as described in FIG. 12. For example, a network element can decode an SLA TLV, and if the SLA TLV includes SLA sub-TLVs that include communication parameters, the network element can implement the communication parameters. However, if the SLA TLV does not include SLA sub-TLVs, the network element can establish a link with an SLA database to retrieve the communication parameters.

Figure 13:
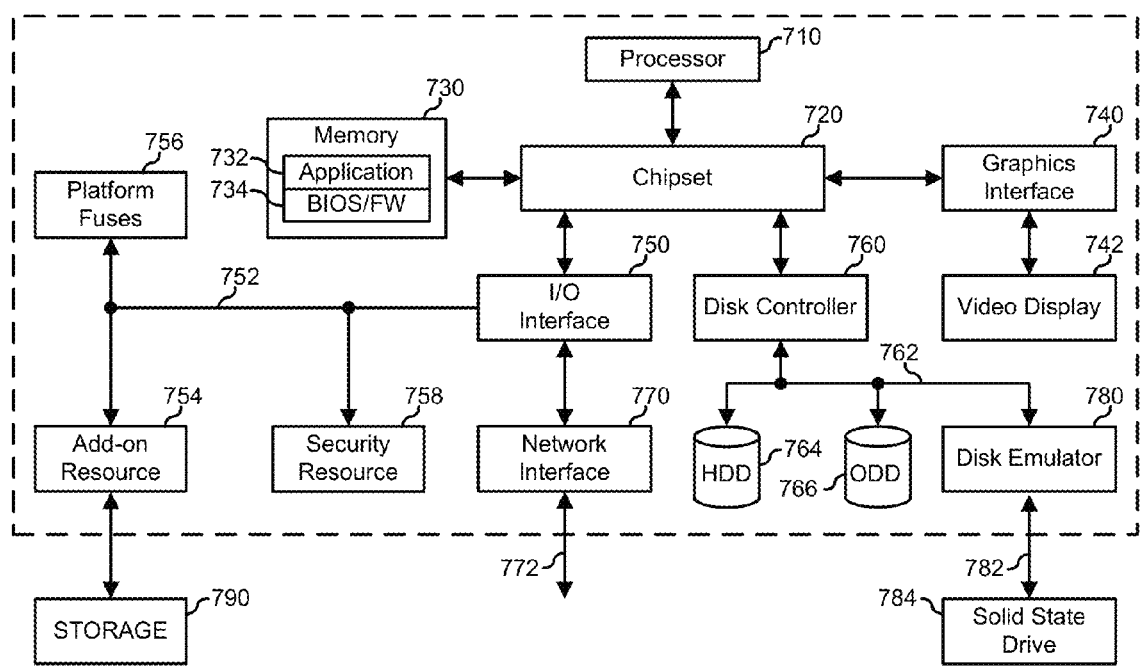
FIG. 13 is a functional block diagram illustrating an exemplary embodiment of an information handling system.

FIG. 13 is a block diagram illustrating an embodiment of an information handling system 700, including a processor 710, a chipset 720, a memory 730, a graphics interface 740, an input/output (I/O) interface 750, a disk controller 760, a network interface 770, and a disk emulator 780. In a particular embodiment, information handling system 700 is used to carry out one or more of the methods described herein. In another embodiment, one or more of the systems described herein are implemented in the form of information handling system 700.

Chipset 720 is connected to and supports processor 710, allowing the processor to execute machine-executable code. In a particular embodiment, information handling system 700 includes one or more additional processors, and chipset 720 supports the multiple processors, allowing for simultaneous processing by each of the processors and permitting the exchange of information among the processors and the other elements of the information handling system. Chipset 720 can be connected to processor 710 via a unique channel, or via a bus that shares information among the processor, the chipset, and other elements of information handling system 700.

Memory 730 is connected to chipset 720. Memory 730 and chipset 720 can be connected via a unique channel, or via a bus that shares information among the chipset, the memory, and other elements of information handling system 700. In another embodiment (not illustrated), processor 710 is connected to memory 730 via a unique channel. In another embodiment (not illustrated), information handling system 700 includes separate memory dedicated to each of the one or more additional processors. A non-limiting example of memory 730 includes static random access memory (SRAM), dynamic random access memory (DRAM), non-volatile random access memory (NVRAM), read only memory (ROM), flash memory, another type of memory, or any combination thereof.

Graphics interface 740 is connected to chipset 720. Graphics interface 740 and chipset 720 can be connected via a unique channel, or via a bus that shares information among the chipset, the graphics interface, and other elements of information handling system 700. Graphics interface 740 is connected to a video display 742. Other graphics interfaces (not illustrated) can also be used in addition to graphics interface 740 as needed or desired. Video display 742 includes one or more types of video displays, such as a flat panel display, another type of display device, or any combination thereof.

I/O interface 750 is connected to chipset 720. I/O interface 750 and chipset 720 can be connected via a unique channel, or via a bus that shares information among the chipset, the I/O interface, and other elements of information handling system 700. Other I/O interfaces (not illustrated) can also be used in addition to I/O interface 750 as needed or desired. I/O interface 750 is connected via an I/O interface 752 to one or more add-on resources 754. Add-on resource 754 is connected to a storage system 790, and can also include another data storage system, a graphics interface, a network interface card (NIC), a sound/video processing card, another suitable add-on resource or any combination thereof. I/O interface 750 is also connected via I/O interface 752 to one or more platform fuses 756 and to a security resource 758. Platform fuses 756 function to set or modify the functionality of information handling system 700 in hardware. Security resource 758 provides a secure cryptographic functionality and includes secure storage of cryptographic keys. A non-limiting example of security resource 758 includes a Unified Security Hub (USH), a Trusted Platform Module (TPM), a General Purpose Encryption (GPE) engine, another security resource, or a combination thereof.

Disk controller 760 is connected to chipset 720. Disk controller 760 and chipset 720 can be connected via a unique channel, or via a bus that shares information among the chipset, the disk controller, and other elements of information handling system 700. Other disk controllers (not illustrated) can also be used in addition to disk controller 760 as needed or desired. Disk controller 760 includes a disk interface 762. Disk controller 760 is connected to one or more disk drives via disk interface 762. Such disk drives include a hard disk drive (HAD) 764, and an optical disk drive (ODD) 766, and can include one or more disk drive as needed or desired. ODD 766 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 760 is connected to disk emulator 780. Disk emulator 780 permits a solid-state drive 784 to be coupled to information handling system 700 via an external interface 782. External interface 782 can include industry standard busses such as USB or IEEE 1394 (Firewire) or proprietary busses, or any combination thereof. Alternatively, solid-state drive 784 can be disposed within information handling system 700.

Network interface device 770 is connected to I/O interface 750. Network interface 770 and I/O interface 750 can be coupled via a unique channel, or via a bus that shares information among the I/O interface, the network interface, and other elements of information handling system 700. Other network interfaces (not illustrated) can also be used in addition to network interface 770 as needed or desired. Network interface 770 can be a network interface card (NIC) disposed within information handling system 700, on a main circuit board such as a baseboard, a motherboard, or any combination thereof, integrated onto another component such as chipset 720, in another suitable location, or any combination thereof. Network interface 770 includes a network channel 772 that provide interfaces between information handling system 700 and other devices (not illustrated) that are external to information handling system 700. Network interface 770 can also include additional network channels (not illustrated).

Information handling system 700 includes one or more application programs 732, and Basic Input/Output System and Firmware (BIOS/FW) code 734. BIOS/FW code 734 functions to initialize information handling system 700 on power up, to launch an operating system, and to manage input and output interactions between the operating system and the other elements of information handling system 700. In a particular embodiment, application programs 732 and BIOS/FW code 734 reside in memory 730, and include machine-executable code that is executed by processor 710 to perform various functions of information handling system 700. In another embodiment (not illustrated), application programs and BIOS/FW code reside in another storage medium of information handling system 700. For example, application programs and BIOS/FW code can reside in HDD 764, in a ROM (not illustrated) associated with information handling system 700, in an option-ROM (not illustrated) associated with various devices of information handling system 700, in storage system 790, in a storage system (not illustrated) associated with network channel 772, in another storage medium of information handling system 700, or a combination thereof. Application programs 732 and BIOS/FW code 734 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   establishing a connectivity fault management (CFM) management domain, wherein the CFM management domain includes a local host processing system and a remote network switching element;
   determining at the local host processing system that a media access control (MAC) address of a virtual machine of the local host processing system is associated with a network service level agreement (SLA), wherein the network SLA specifies a rate shaping parameter for the management domain;
   detecting, by a CFM agent of the local host processing system, that a data packet is from the MAC address;
   determining, by the CFM agent, that the MAC address is a new MAC address for the local host processing system;
   issuing, by the CFM agent, a CFM frame to the management domain in response to determining that the MAC address is a new MAC address for the local host processing system;
   receiving the CFM frame at the remote network switching element; and
   configuring the remote network switching element to operate with the specified rate shaping parameter in response to receiving the CFM frame.

2. The method of claim 1, further comprising:
in response to determining that the MAC is associated with the network SLA, retrieving, by the local host processing system, a communication parameter associated with the network SLA;
wherein the CFM frame includes the communication parameter, and configuring the remote network switching element includes configuring the remote network switching element according to the communication parameter.

3. The method of claim 1, further comprising:
in response to receiving the CFM frame, retrieving by the remote network switching element a communication parameter associated with the network SLA;
wherein configuring the remote network switching element includes configuring the remote network switching element according to the communication parameter.

4. The method of claim 3, further comprising:
establishing a link between the remote network switching element and an SLA database;
wherein the communication parameter is retrieved from the SLA database.

5. The method of claim 4, wherein the link comprises a secure link.

6. The method of claim 1, wherein:
the remote network switching element comprises a storage device; and
configuring the network SLA includes provisioning the virtual machine system with a storage volume of the storage device.

7. The method of claim 1, wherein the CFM frame includes an SLA type-length-value field (TLV) that includes the MAC address.

8. The method of claim 7, wherein:
the SLA TLV includes an SLA sub-TLV that includes a communication parameter associated with the network SLA; and
configuring the remote network switching element includes configuring the remote network switching element according to the communication parameter.

9. The method of claim 8, wherein the communication parameter includes at least one of a maximum bandwidth, a minimum bandwidth, a maximum burst rate, a priority level, a virtual local area network, an access control parameter, and a rate shaping parameter.

10. An information handling system comprising:
a processor;
a memory including code executable by the processor;
a virtual machine hypervisor operable to:
provision a virtual machine with a media access control (MAC) address; and
establish a network service level agreement (SLA) for the virtual machine, wherein the network SLA specifies a maximum ingress bandwidth and a maximum egress bandwidth; and
a connectivity fault management (CFM) agent operable to:
detect that a data packet is from the MAC address;
determine that the MAC address is a new MAC address for the information handling system; and
issue a CFM frame to a CFM management domain, wherein the CFM frame includes the MAC address, the CFM frame being operable to configure a remote network switching element of the CFM management domain with the maximum ingress bandwidth and the maximum egress bandwidth in response to determining that the MAC address is a new MAC address for the information handling system.

11. The information handling system of claim 10, wherein the CFM frame includes a communication parameter associated with the network SLA.

12. The information handling system of claim 10, wherein in establishing the network SLA, the virtual machine hypervisor is further operable to:
determine a communication parameter associated with the network SLA; and
provide the communication parameter to an SLA database.

13. The information handling system of claim 12, wherein, in issuing the CFM frame, the CFM agent is further operable to:
retrieve the communication parameter from the SLA database; and
include the communication parameter in the CFM frame comprising:
in response to receiving the CFM frame, retrieving by the remote network switching element a communication parameter associated with the network SLA;
wherein configuring the remote network switching element includes configuring the remote network switching element according to the communication parameter.

14. The information handling system of claim 10, wherein the network SLA includes communication parameters for setting up a storage capacity associated with the virtual machine.

15. The information handling system of claim 10, wherein the CFM frame includes an SLA type-length-value field (TLV) that includes the MAC address.

16. The information handling system of claim 15, wherein the SLA TLV includes an SLA sub-TLV that includes a communication parameter associated with the network SLA.

17. A non-transitory computer-readable medium including code for performing a method, the method comprising:
establishing a connectivity fault management (CFM) management domain, wherein the CFM management domain includes a local host processing system and a remote network switching element;
determining at the local host processing system that a media access control (MAC) address of a virtual machine of the local host processing system is associated with a network service level agreement (SLA), wherein the network SLA specifies a virtual local area network (VLAN) for the management domain;
detecting, by a CFM agent of the local host processing system, that a data packet if from the MAC address;
determining, by the CFM agent, that the MAC address is a new MAC address for the local host processing system;
issuing, by the CFM agent, a CFM frame to the management domain in response to determining that the MAC address is a new MAC address for the local host processing system;
receiving the CFM frame at the remote network switching element; and
configuring the remote network switching element to operate with the specified VLAN in response to receiving the CFM frame.

18. The computer-readable medium of claim 17, the method further comprising:
in response to determining that the MAC is associated with the network SLA, retrieving, by the local host processing system, a communication parameter associated with the network SLA;
wherein the CFM frame includes the communication parameter, and configuring the remote network switching element includes configuring the remote network switching element according to the communication parameter.

19. The computer-readable medium of claim 17, the method further comprising:
in response to receiving the CFM frame, retrieving by the remote network switching element a communication parameter associated with the network SLA;
wherein configuring the remote network switching element includes configuring the remote network switching element according to the communication parameter.

20. The computer-readable medium of claim 19, the method further comprising:
establishing a link between the remote network switching element and an SLA database;
wherein the communication parameter is retrieved from the SLA database.

\* \* \* \* \*